(12) United States Patent
Mentze et al.

(10) Patent No.: US 7,269,653 B2
(45) Date of Patent: Sep. 11, 2007

(54) WIRELESS NETWORK COMMUNICATIONS METHODS, COMMUNICATIONS DEVICE OPERATIONAL METHODS, WIRELESS NETWORKS, CONFIGURATION DEVICES, COMMUNICATIONS SYSTEMS, AND ARTICLES OF MANUFACTURE

(75) Inventors: Duane Mentze, Roseville, CA (US); Nathan Harmon, Roseville, CA (US); Brett Williams, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 10/703,878

(22) Filed: Nov. 7, 2003

(65) Prior Publication Data
US 2005/0101293 A1 May 12, 2005

(51) Int. Cl.
*G06F 13/00* (2006.01)
(52) U.S. Cl. .................. 709/227; 709/219; 709/225; 709/250
(58) Field of Classification Search ................ 709/217, 709/219, 223, 224, 225, 227, 228
See application file for complete search history.

(56) References Cited

U.S. PATENT DOCUMENTS

| | | | |
|---|---|---|---|
| 5,291,543 A | 3/1994 | Freese et al. | |
| 5,768,695 A | 6/1998 | Fischer et al. | |
| 5,987,062 A | 11/1999 | Engwer et al. | |
| 6,069,887 A | 5/2000 | Geiger et al. | |
| 6,199,077 B1 | 3/2001 | Inala et al. | |
| 6,259,891 B1 | 7/2001 | Allen | |
| 6,311,054 B1 | 10/2001 | Korpela | |
| 6,529,728 B1 | 3/2003 | Pfeffer et al. | |
| 2002/0176579 A1* | 11/2002 | Deshpande et al. ......... | 380/270 |
| 2003/0027549 A1 | 2/2003 | Kiel et al. | |
| 2003/0120920 A1* | 6/2003 | Svensson .................... | 713/168 |
| 2004/0203581 A1 | 10/2004 | Sharon et al. | |
| 2004/0242197 A1 | 12/2004 | Fontaine | |
| 2005/0005013 A1 | 1/2005 | Saint-Hilaire et al. | |
| 2005/0059396 A1 | 3/2005 | Chuah et al. | |
| 2005/0060532 A1 | 3/2005 | Dorenbosch et al. | |
| 2005/0102529 A1* | 5/2005 | Buddhikot et al. ......... | 713/200 |

OTHER PUBLICATIONS

"HP Jetdirect 802.11b Print Servers—Wireless Security Concepts and Terminology"; http://h20015.www2.hp.com/en/document.jhtml?lc= en&docName=bpj0732.pdf; Jul. 10, 2003; 4 pp.

(Continued)

*Primary Examiner*—Viet D. Vu

(57) ABSTRACT

Wireless network communications methods, communications device operational methods, wireless networks, configuration devices, communications systems, and articles of manufacture are described. According to one aspect, a wireless network communications method includes providing wireless network access data and network security data using a configuration device, wherein the wireless network access data corresponds to a respective wireless network, communicating the wireless network access data and the network security data to a communications device using the configuration device, providing access of the communications device to a first portion of the wireless network using the wireless network access data, communicating the network security data to the wireless network using the communications device, and providing access of the communications device to a second portion of the wireless network using the network security data.

24 Claims, 5 Drawing Sheets

OTHER PUBLICATIONS

"HP Jetdirect 802.11b Print Servers—Wireless Security Overview"; http://h20015.www2.hp.com/en/document.jhtml?lc= en&doc Name= bpj07460.pdf; Jul. 10, 2003; 2 pp.

"HP Jetdirect Administrators Manual"; http://h20000.www2.hp.com/bc/docs/support/SupportManual/bpj07646/bpj07646/bpj07646.pdf; Oct. 2002; pp. 256-261.

"Fascinator", http://webhome.idirect.com/-jproc/crypto/fascinator.html, 2 pages.

"Wireless Network Access Methods, Communications Device Configuration Methods, Configuration Devices, Communications Systems, and Articles of Manufacture;" Brett Williams et al.; Filed Concurrently.

"Wireless Network Monitoring Methods, Configuration Devices, Communications Systems, and Articles of Manufacture;" Brett Williams et al.; Filed Concurrently.

* cited by examiner

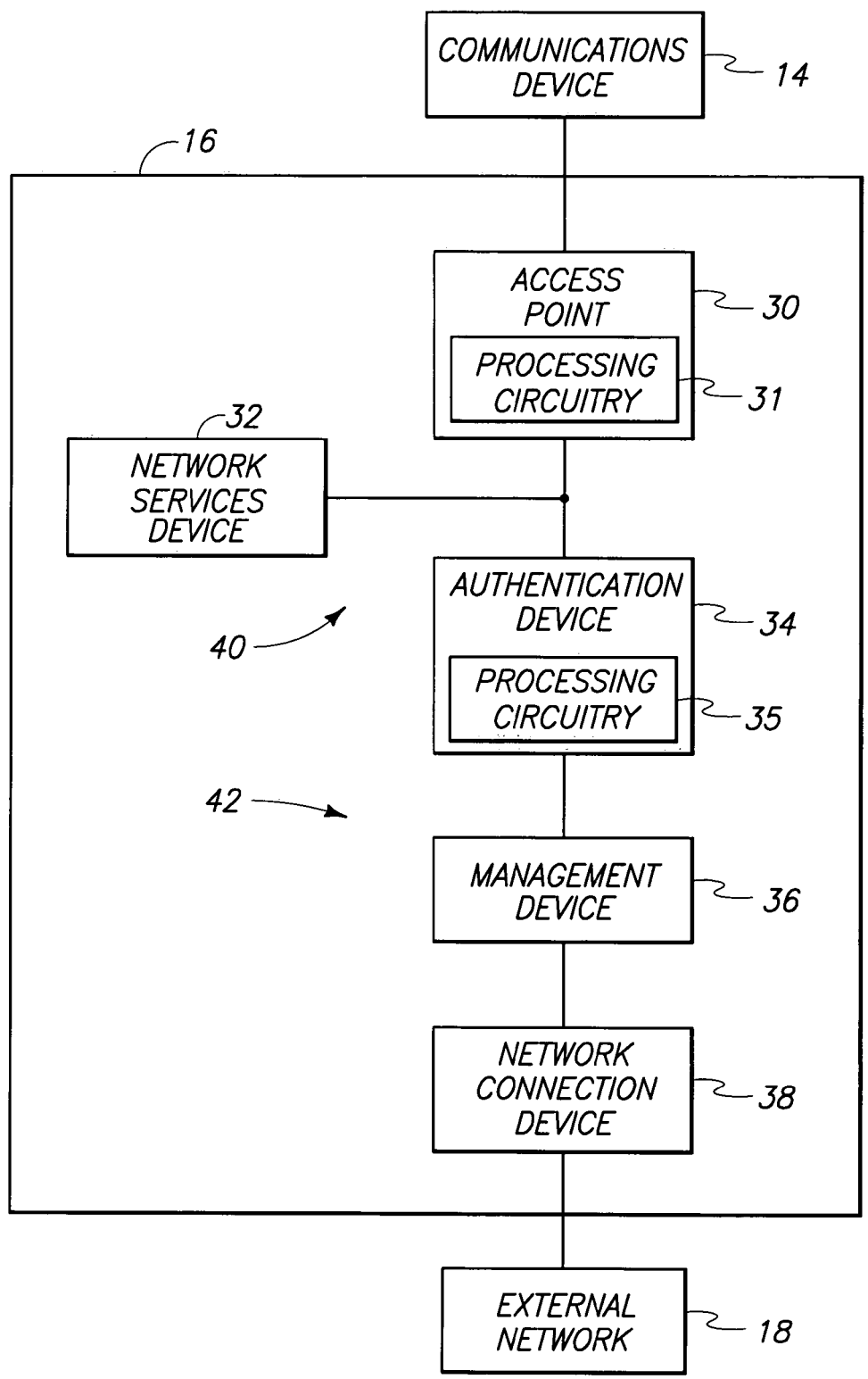

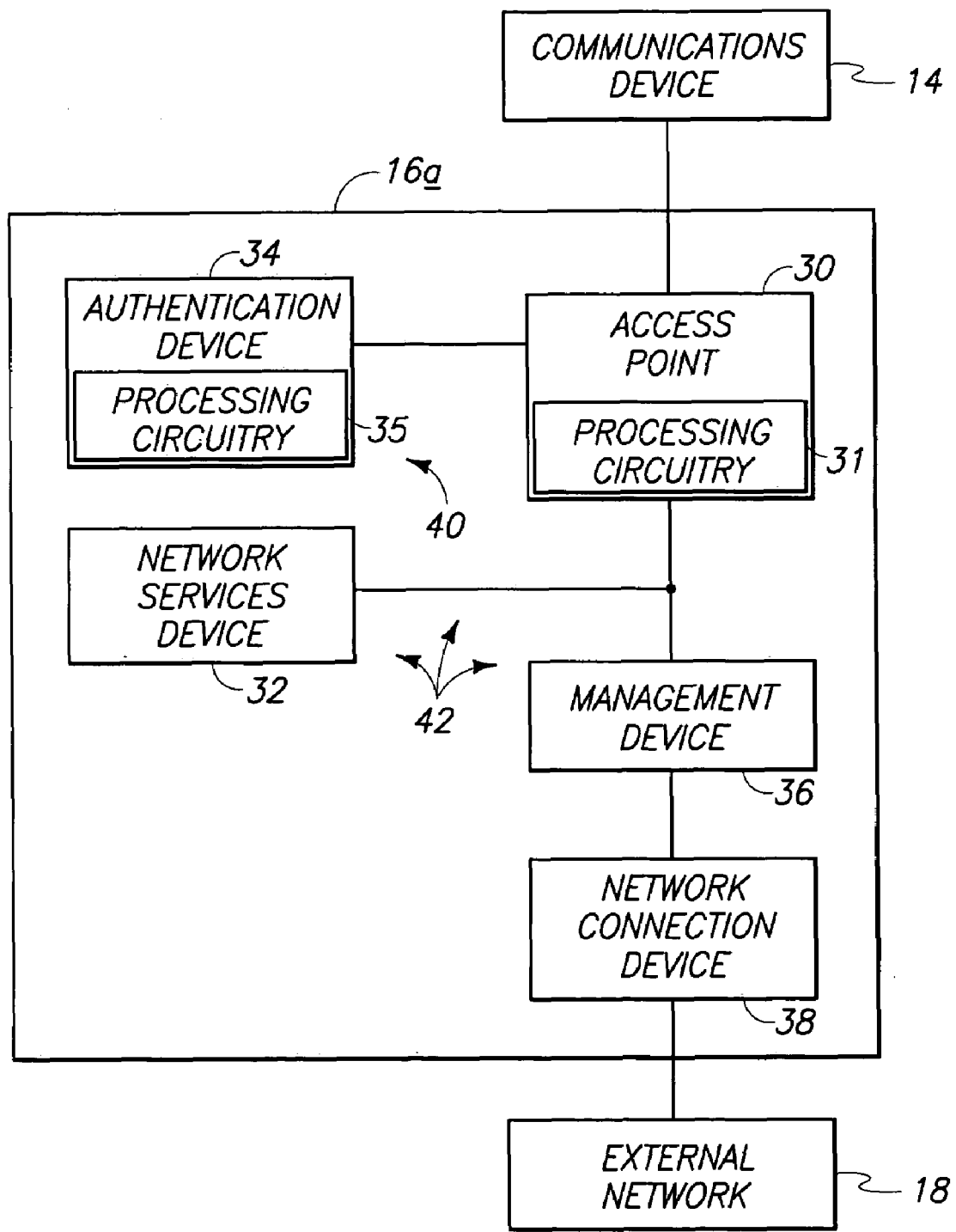

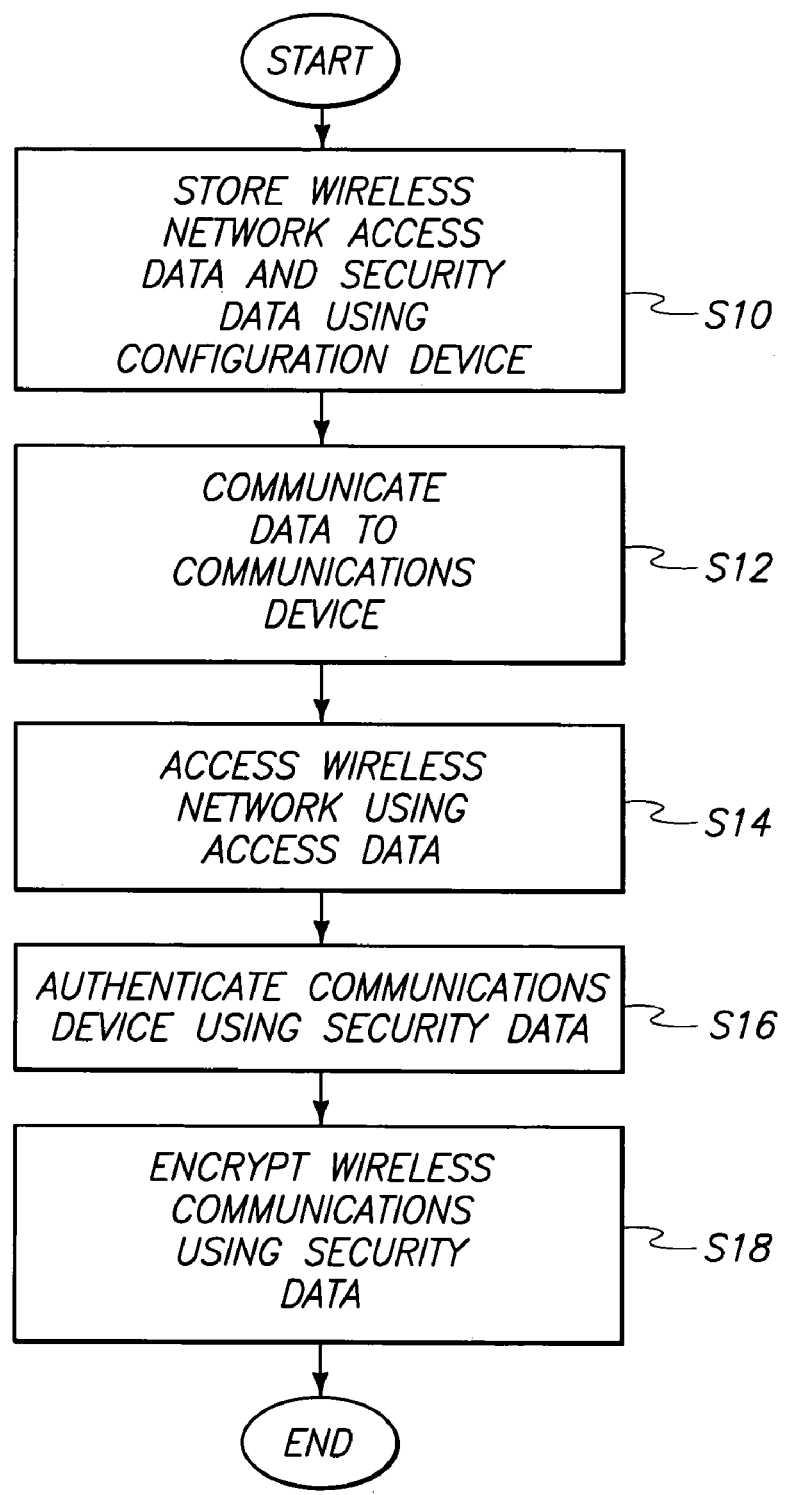

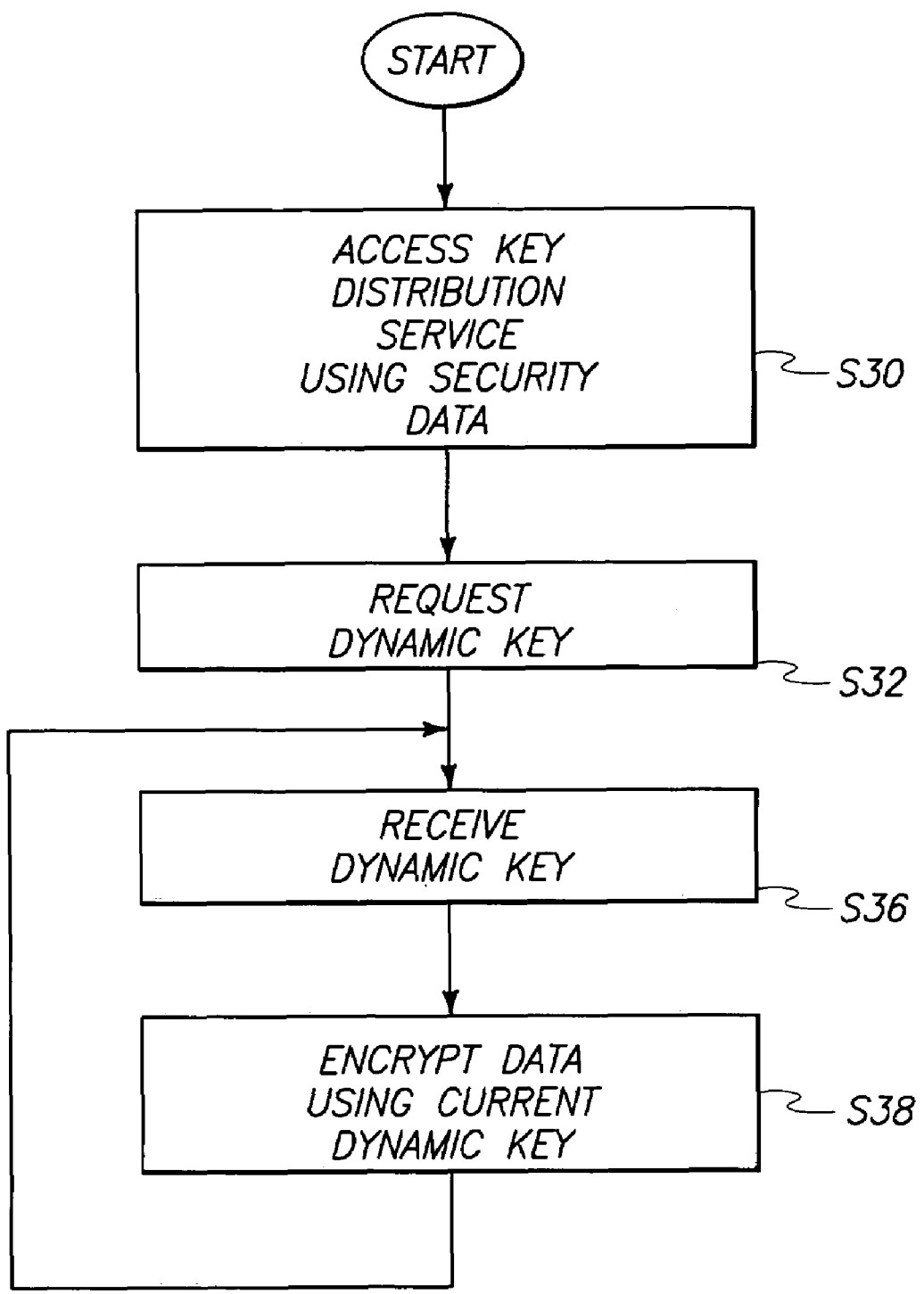

WIRELESS NETWORK COMMUNICATIONS METHODS, COMMUNICATIONS DEVICE OPERATIONAL METHODS, WIRELESS NETWORKS, CONFIGURATION DEVICES, COMMUNICATIONS SYSTEMS, AND ARTICLES OF MANUFACTURE

CROSS REFERENCE TO RELATED APPLICATIONS

This application is related to copending U.S. Patent Application entitled "Wireless Network Access Methods, Communications Device Configuration Methods, Configuration Devices, Communications Systems, And Articles Of Manufacture" application Ser. No. 10/703,877, listing Brett Williams, Nathan Harmon, and Duane Mentze as inventors, and copending U.S. Patent Application entitled "Wireless Network Monitoring Methods, Configuration Devices, Communications Systems, And Articles Of Manufacture" application Ser. No. 10/703,877, listing Brett Williams, Nathan Harmon, and Duane Mentze as inventors, which were filed concurrently and which are incorporated by reference herein.

FIELD OF THE INVENTION

Aspects of the invention relate to wireless network communications methods, communications device operational methods, wireless networks, configuration devices, communications systems, and articles of manufacture.

BACKGROUND OF THE INVENTION

Computing devices, such as personal computers, pocket PCs and other devices, continue to be used in new processing and communications applications. For example, the increased processing speeds and computational power of these devices has greatly enhanced the popularity and usage of the devices. More recently, advancements in networking and other communications between computing devices has also experienced significant improvements. Computing devices now quickly and efficiently communicate with other devices including e-mail, browsing, and other communications.

Portable computing devices have also experienced significant growth in capabilities and popularity. Wireless local area networks, such as wireless fidelity (WiFi) networks, have been developed to enable users to wirelessly access and communicate with other networked devices, such as Internet devices and other devices coupled with local area networks. For example, 802.11b networks are being used in an increased number of applications and locations to provide electronic connectivity. Coverage of the wireless local area network may be referred to as a hotspot. Public wireless local area networks may provide communications in office locations, public places, or other applications wherein electronic communications are desired. For example, wireless local area networks are now utilized in airport terminals, coffeehouses, and other establishments, providing public and/or membership access to the wireless local area network, and perhaps the Internet for browsing and e-mail communications.

Some drawbacks have been experienced with respect to connecting devices to wireless local area networks. For example, to connect to some networks, a computing device may use appropriate connection information including a network name (e.g., SSID) and mode of operation. In addition, the device may need to be authenticated and use appropriate encryption to send and receive communications with respect to the wireless local area network. Other information may also be necessary to establish communications between a given computing device and a wireless local area network. Accordingly, a user would manually configure the appropriate parameters or settings to provide network access. Without appropriate configuration of the computing device, a user may be unable to access the wireless local area network. However, manual configuration may be difficult for some users, subject to user errors, etc.

In one example, a user may desire to access a hotspot service provider (e.g., t-mobile.com) to access the public Internet. The user may setup the device for wireless access, purchase time from the provider, provide a computer at the location of the hotspot and manually attempt to connect to the service. At least some users may have difficulty manually configuring their computer to access the service, and as a result, become frustrated and avoid using the service.

Some wireless network arrangements may employ various security measures or protocols to provide communications and/or access to the wireless network of increased security. Some security measures or protocols utilize some initial configuration to provide appropriate operation. Accordingly, a user may also perform security configuration operations in addition to system configuration operations to access the wireless network, and may encounter associated problems or frustrations with respect to such additional configuring. Some security protocols use dynamic key distribution services providing key rotation to reduce vulnerability as computational power increases. Dynamic key distribution services may have drawbacks of increased complexity with respect to configuration and administration.

According to at least some embodiments of the disclosure, improved methods and apparatus of accessing wireless networks implementing security measures are described.

SUMMARY OF THE INVENTION

According to one aspect, a wireless network communications method comprises providing wireless network access data and network security data using a configuration device, wherein the wireless network access data corresponds to a respective wireless network, communicating the wireless network access data and the network security data to a communications device using the configuration device, providing access of the communications device to a first portion of the wireless network using the wireless network access data, communicating the network security data to the wireless network using the communications device, and providing access of the communications device to a second portion of the wireless network using the network security data.

According to another aspect of the invention, a wireless network comprises a wireless communications interface configured to implement wireless communications with a plurality of communications devices, a plurality of configuration devices configured to store wireless access data and network security data corresponding to the wireless network, wherein respective ones of the configuration devices are arranged to configure respective ones of the communications devices, and processing circuitry coupled with the wireless communications interface and configured to access the wireless network access data and the network security data received via the wireless communications interface from the communication devices, wherein the processing circuitry is further configured to process the wireless network access data and the network security data to provide communications intermediate the communications devices and the wireless network.

According to an additional aspect of the invention, an article of manufacture comprises a processor-usable medium comprising processor-usable code configured to cause processing circuitry of a communications device to access wireless network access data from a configuration device, wherein the wireless network access data corresponds to a respective wireless network, access network security data from the configuration device, wherein the network security data corresponds to a security protocol of the wireless network, implement wireless communications with the wireless network using the wireless network access data, and configure the wireless communications using the network security data in accordance with the security protocol of the wireless network.

Other aspects are disclosed as is apparent from the following description.

DESCRIPTION OF THE DRAWINGS

FIG. 3 is a functional block diagram of a wireless network according to one embodiment.

FIG. 4 is a functional block diagram of a wireless network according to another embodiment.

FIG. 5 is a flow chart illustrating a methodology for accessing a wireless network implementing security measures according to one embodiment.

FIG. 6 is a flow chart illustrating a methodology for accessing a dynamic key distribution service of the wireless network according to one embodiment.

DETAILED DESCRIPTION OF THE INVENTION

Figure 1:
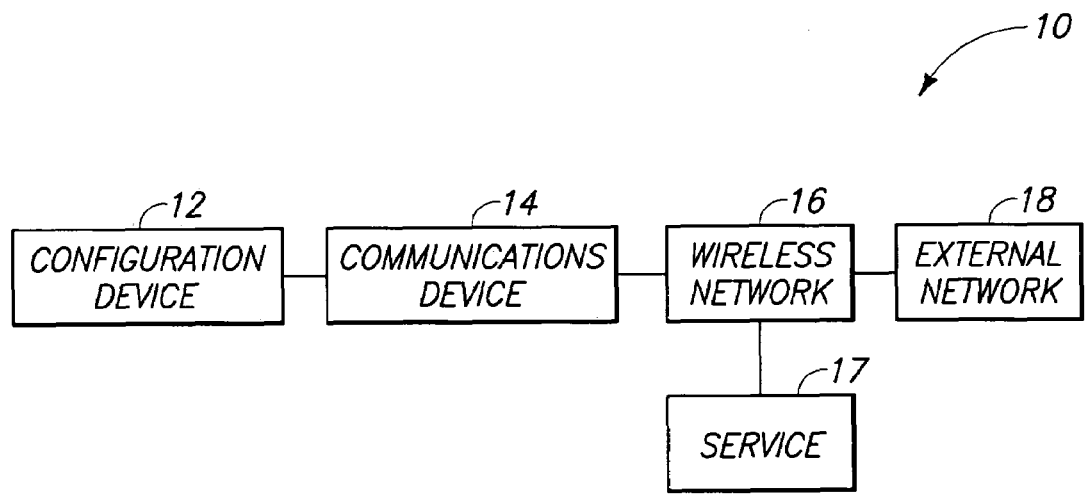
FIG. 1 is a functional block diagram illustrating a communications system according to one embodiment.

Referring to FIG. 1, an exemplary communications system 10 is shown. The depicted components of communications system 10 are configured to electronically communicate with another. The illustrated communications system 10 includes a configuration device 12, a communications device 14, a wireless network 16, a service 17, and an external network 18. Other configurations of system 10 are possible in other embodiments. For example, external network 18 may be omitted in at least one other embodiment. In addition, a plurality of communications devices 14 may be configured by one or more respective configuration device 12 to communicate with wireless network 16 in another embodiment.

Configuration device 12 operates to configure communications device 14 in one embodiment. In exemplary aspects, configuration device 12 configures communications device 14 to communicate with wireless network 16. Communications device 14 may be established as a node on wireless network 16 using configuration information (e.g., wireless network access data and/or network security data described below) received from configuration device 12 in one embodiment. Network security data corresponds to security measures or protocols implemented by wireless network 16 in one embodiment.

Communications device 14 is arranged by configuration device 12 to communicate with wireless network 16. Exemplary configurations of communications device 14 include a personal computer (PC) or pocket PC (e.g., iPAQ available from the Hewlett-Packard Company). Other embodiments of communications device 14 are possible. For example, communications device 14 may be arranged as any electrical device configured to implement wireless communications. Communications device 14 may include computational and/or data processing capabilities in some embodiments.

Wireless network 16 is configured to implement wireless communications with at least some devices or networks coupled with the network 16. Wireless network 16 may also provide wired connectivity to one or more devices or networks coupled therewith. An exemplary arrangement of wireless network 16 comprises a wireless local area network, such as a 802.11b network, in one example. Wireless network 16 may comprise a public wireless network and be referred to as a hotspot in but one implementation. As described further below, wireless network 16 may be arranged to implement one or more security measure or protocol to provide communications of enhanced security with respect to eavesdropping, unauthorized access and/or other malicious activity with respect to wireless network 16.

Service 17 performs electronic actions with respect to communications device 14 in at least one example. For example, service 17 may perform desired actions responsive to commands, requests, or other communications originating from communications device 14. Service 17 may be tailored to the location and application of the wireless network 16. One example of service 17 includes a hotspot service provider for exemplary embodiments wherein wireless network 16 provides public communications in an airport terminal, coffeehouse, or other location. Another example of service 17 includes managing image forming devices (e.g., printers) available on the wireless network 16. Another possible service 17 includes accessing services of a library via wireless network 16. The described services 17 are exemplary and provision of other electrical actions may be performed by service 17 with respect to communications device 14 in other embodiments.

External network 18 is coupled with wireless network 16. Communications device 14 may access external network 18 via wireless network 16 in the depicted example. One embodiment of external network 18 comprises the public Internet. Other arrangements of external network 18 are possible and may include wireless and/or wired components. Communications device 14 may access a service (not shown) coupled with external network 18.

Figure 2:
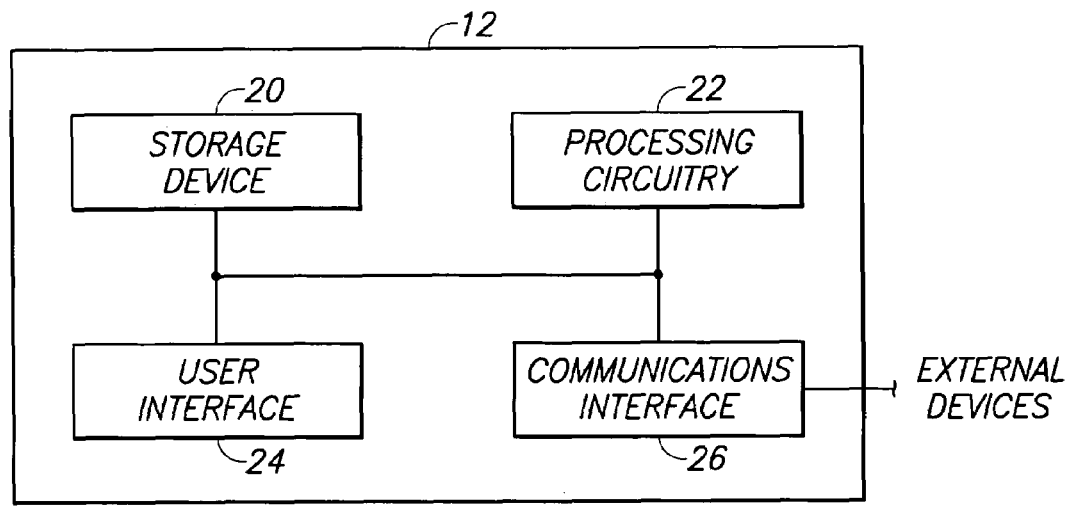
FIG. 2 is a functional block diagram illustrating hardware components of a configuration device or a communications device according to illustrative exemplary embodiments.

Referring to FIG. 2, an exemplary arrangement of configuration device 12 is shown. The depicted arrangement may also correspond to one embodiment of communications device 14. The illustrated configuration device 12 includes a storage device 20, processing circuitry 22, user interface 24, and communications interface 26. Configuration device 12 (or communications device 14) may include more, less, or alternative components. For example, for configuration device embodiments, the processing circuitry 22 and/or user interface 24 may be omitted.

Storage device 20 is configured to store electronic data and/or programming such as executable instructions (e.g., software and/or firmware), data, or other digital information and may include processor-usable media. Processor-usable media includes any article of manufacture that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. Storage device 20 of configuration device 12 and/or communications device 14 may be configured to store wireless network access data and/or network security data as described further below according to illustrative embodiments.

In one embodiment, processing circuitry 22 may comprise circuitry configured to implement desired programming. For example, the processing circuitry 22 may be implemented as a processor or other structure configured to execute executable instructions including, for example, software and/or firmware instructions. Other exemplary embodiments of processing circuitry 22 include hardware logic, PGA, FPGA, ASIC, and/or other structures. These examples of processing circuitry 22 are for illustration and other configurations are possible.

User interface 24 may be embodied as any appropriate apparatus configured to display or convey user information and/or receive user input. Exemplary embodiments of user interface 24 comprise a display, speaker, keyboard, mouse, etc.

Communications interface 26 is configured to couple with and implement communications with respect to external devices. Communications interface 26 may provide wired and/or wireless communications. Exemplary embodiments of communications interface 26 comprise electromagnetic transmit and receive circuitry (e.g., radio frequency, infrared, etc.) or other wireless circuitry, USB port, parallel port, or serial port. Communications interface 26 may be embodied in any appropriate configuration to externally communicate electronic data. In one embodiment, configuration device 12 is provided in communication with communications device 14 during communications between communications device 14 and wireless network 16 (e.g., accessing of wireless network 16). In other embodiments, configuration device 12 may configure communications device 14 and then be removed from communication with device 14.

For configuration device embodiments, storage device 20 may store wireless network access data used to configure communications device 14 to access wireless network 16 and/or to access service 17. Network access data is arranged to facilitate connection of communications device 14 with wireless network 16 to enable communications. Network security data may also be stored using storage device 20. Network security data may correspond to security measures, procedures, protocols or other mechanisms employed by wireless network 16 to provide communications of enhanced security. Storage device 20 may also comprise service access data to facilitate communications with respect to a service 17, if present. A storage device of communications device 14 may also store wireless network access data, network security data and/or service access data received from configuration device 12.

The wireless network access data may be tailored to the associated type of wireless network 16 to be accessed. Exemplary wireless network access data may comprise network identification information of the wireless network 16. Exemplary network identification information includes the network name, or Service Set Identifier (e.g., SSID), which identifies the Extended Service Set (ESS). Network access data may comprise mode of operation information, for example specifying ad hoc peer-to-peer configuration, or infrastructure configuration. Network access data may comprise any other information configured to facilitate or assist a user with accessing and using wireless network 16.

Service access data may also be tailored to the type of service 17 to be accessed, and/or the location or implementation of the service 17. In one embodiment, service access data may comprise a navigation identifier associated with the service 17. For example, if service 17 comprises a node on wireless network 16, the navigation identifier may comprise an electronic address, such as an Internet Protocol (IP) address, of the service 17. If service 17 is coupled with external network 18 comprising the public Internet, the navigation identifier may comprise a Uniform Resource Locator (URL) of the service 17. Other types of navigation identifiers may be used providing any suitable navigation to service 17.

Service access data may also comprise a command to initiate performance of an action of service 17 with respect to communications device 14. For example, the command may automatically cause the loading of a web page associated with service 17 using communications device 14, display devices of service 17 accessible to communications device 14 (e.g., communicate a Universal Naming Convention (UNC) path command to initiate display of shared devices or services accessible to communications device 14, perhaps associated with the username) or provide other desired operations.

Exemplary service access data may include user information corresponding to a user of the communications device 14 and may initiate operations or actions of service 17 applicable and/or tailored to an identified user as identified by the user information (e.g., permit services for which the user has rights). The user information may cause service 17 to perform the action in consideration of the user information (e.g., automatically launch an application of service 17 using a command of the service access data and seed the application using user information of the service access data). Service access data may comprise any other information configured to facilitate or assist a user with accessing and using service 17.

Network security data may also be tailored to the associated respective wireless network 16. Wireless network 16 may employ one or more security mechanism to enhance security of wireless communications intermediate communications device 14 and wireless network 16. Exemplary security mechanisms implement authentication aspects to deter unauthorized users from accessing an entirety of wireless network 16 or secure portions of wireless network 16, and/or encryption aspects to deter unauthorized entities from eavesdropping or monitoring wireless communications intermediate communications device 14 and wireless network 16. Other security aspects may be provided in other embodiments.

As mentioned above, the network security data may be programmed according to the arrangement of wireless network 16 being accessed. Authentication may be implemented using one of a plurality of protocols. In one shared key example, a standard level of validation is implemented using Wired Equivalent Privacy (WEP) security wherein a secret WEP key is configured on individual communication devices 14 accessing the wireless network 16. Accordingly, the network security data may comprise a WEP key in one embodiment. Remote Authentication Dial In User Service, RFC 2138 (RADIUS) authentication may be implemented in other embodiments. For example, Extensible Authentication Protocol and Message-Digest Algorithm 5, RFC 1321

(EAP-MD5) using RADIUS may be used wherein the network security data comprises a respective username and password, and may also comprise a command configured to cause the communications device 14 to submit the username and password in an access request to wireless network 16. In another RADIUS example, Extensible Authentication Protocol and Transport Layer Security (EAP-TLS) may be used wherein the network security data comprises a digital certificate (e.g., X.509 digital certificate). EAP-MD5 and EAP-TLS may use 802.1x as described further below. Lightweight Extensible Authentication Protocol (LEAP) may be used in other embodiments wherein network security data comprising a username and a password provide mutual authentication with a RADIUS server of wireless network 16. Network security data may be provided for any other desired authentication protocol, such as, EAP-TTLS (Tunneled Transport Level Security), and EAP-PEAP (Protected Extensible Authentication Protocol), for example. The above examples are illustrative and other authentication operations may be used in other embodiments.

Network security data may also comprise data used to implement encryption operations. In one encryption example, the network security data may comprise a secret WEP key. WEP keys may be static or dynamic. For wireless networks 16 using RADIUS and MD5 authentication, an appropriate static key may be used. For LEAP and TLS authentication, dynamic WEP keys may be used. An access point of wireless network 16 described below may control the rotation and distributions of dynamic keys. For dynamic key applications, the network security data may comprise an address or other navigation identifier of the location of a dynamic key distribution service configured to manage cryptographic keys (e.g., access point 30). In addition, the type of dynamic key distribution service may also be provided within the network security data enabling the communications device 14 to identify the appropriate service. In other embodiments, communications device 14 may include appropriate programming (native or downloaded from configuration device 12) to provide searching functionality with respect to identifying the location of the dynamic key distribution service of wireless network 16.

In one embodiment, the network security data configures the communications device 14 (e.g., via a communicated command) to obtain dynamic keys from the dynamic key distribution service. By including identification information of the location and type of dynamic key distribution service within the network security data, the communication device 14 may communicate requests which operate to "pull" dynamic keys from the access point 30 or other appropriate service. In other embodiments, the access point 30 or other appropriate service operates to "push" dynamic keys to the communications device 14.

Information or data in addition to network access data, service access data, and network security data may be stored using storage device 20 of either configuration device 12 or communications device 14. For example, storage device 20 may comprise an operating system and other applications for use by a user or processing circuitry 22 of configuration device 12 or communications device 14. Storage device 20 may comprise programming to assist a user with accessing wireless network 16. For example, storage device 20 of communications device 14 may comprise programming to detect available wireless networks proximate communications device 14 and to display the options to a user (e.g., Windows XP™ Service Pack 1 available from Microsoft Corporation).

According to exemplary aspects described herein, processing circuitry 22 of the communications device 14 may access the network access data downloaded from configuration device 12, and utilize the information to select one of a plurality of detected wireless networks and use the network access data to establish communications device 14 as a node on the wireless network 16. Authentication and encryption operations may be performed using the network security data. The processing circuitry 22 may also forward service access data to wireless network 16 to access service 17. Further, the processing circuitry 22 of communications device 14 may also forward commands, user seed information or other information to assist with accessing wireless network 16 and/or service 17. Accordingly, access to wireless network 16 and/or service 17 may be automated without user input. In other aspects, the processing circuitry 22 may request user input (or a user may input information without a request) during the process of accessing wireless network 16 and/or service 17 and implementing security operations using respective ones of the network access data, service access data, and network security data. Additionally, storage devices 20 of devices 12, 14 may comprise programming to process encrypted communications therebetween in one embodiment. For example, configuration device 12 may encrypt the network access data, network security data, or other appropriate communicated data and communications device 14 may decrypt the communicated data in the described exemplary embodiment.

Referring to FIG. 3, an exemplary configuration of wireless network 16 arranged in a service level authentication embodiment is illustrated. The depicted wireless network 16 comprises an access point 30, a network services device 32, an authentication device 34, a management device 36, and a network connection device 38. Although illustrated as separate devices in FIG. 3, it is possible to implement functions or operations of a plurality of the separate devices within a single device.

Access point 30 comprises a wireless access point in the depicted embodiment configured to provide interfacing between wireless communications (e.g., with communications device 14) and wired devices. In addition, access point 30 may comprise a dynamic key distribution service arranged to control encryption operations (e.g., control management, rotation and distribution of cryptographic keys with respect to one or more device 14) in one embodiment.

Network services device 32 is arranged to dynamically enable communications between nodes of wireless network 16. An exemplary network services device 32 comprises a Dynamic Host Configuration Protocol (DHCP) server configured to assign temporary or permanent electronic addresses to devices coupled with wireless network 16 including communications device 14.

Authentication device 34 is configured to authenticate communications from devices coupled with wireless network 16. In the exemplary service level authentication model of FIG. 3, it is possible for users to communicate with one another via wireless access point 30 without authentication. However, proper authentication is used for communications to external network 18. Accordingly, if the service (not shown in FIG. 3), is implemented using a device coupled with the access point 30, the service may be accessed without authentication. If the service is accessed via the external network 18, proper authentication is used to access the service in the exemplary depicted embodiment. Communications device 14 may communicate network security data comprising authentication information received from configuration device 12 to authentication device 34 for authentication. In one exemplary embodiment, authentication device 34 may be implemented as a RADIUS server and communications device 14 may communicate authentication information comprising a username and a password as described previously.

The exemplary network 16 of FIG. 3 comprises an authentication portion 40 and a secure portion 42. A non-authenticated user may access authentication portion 40 including authentication device 34 (as well as other users communicating with access point 30 in the example configuration of FIG. 3) using the wireless network access data. A communications device 14 is authenticated using the network security data before access of the communications device 14 to secure portion 42 is provided in one example.

Management device 36 is configured to monitor, track and/or control access to and usage of wireless network 16 and/or service 17 by one or more of communications devices 14. Management device 36 may generate, store, and/or communicate network usage information to respective communication devices 14 or other appropriate recipient. Management device 36 may be implemented within a server in one embodiment.

Network connection 38 is configured to implement communications intermediate wireless network 16 and one or more external network 18. Network connection 38 may be implemented as a gateway, router and/or firewall in an exemplary embodiment wherein external network 18 comprises the public Internet.

Access point 30 and authentication device 34 include respective processing circuits 31, 35 in the depicted embodiment. Processing circuits 31, 35 are configured to access and process communicated wireless network access data and network security data to provide communications intermediate communications device 14 and wireless network 16 according to the appropriate configuration and security protocols being used. For example, processing circuitry 31 of access point 30 may communicate cryptographic keys to communications device 14 using the network security data, and processing circuitry 35 of authentication device 34 may authenticate communications device 14 using the network security data.

Referring to FIG. 4, an alternate embodiment of wireless network is illustrated with respect to reference 16a wherein like numerals represent like components with differences being represented by a suffix. The exemplary embodiment of FIG. 4 uses connection level authentication for providing access to the service and wireless network 16a. Authentication device 34 is coupled with access point 30 and communications device 14 is authenticated before accessing wireless network 16a or external network 18 in the embodiment of FIG. 4. Wireless network 16a may be configured according to standard 802.1x that permits wireless network 16a to scale by allowing centralized authentication of users. In one configuration, 802.1x uses authentication protocol Extensible Authentication Protocol (EAP). EAP messages are encapsulated within 802.1x messages and may be referred to as EAPOL or EAP over LAN. In the described example, access point 30 forwards EAP messages to authentication device 34 (e.g., messages comprising service access data) to authenticate communications device 14 before communications device 14 is given access to wireless network 16 or service 17.

Other configurations of wireless network 16 and/or other configurations for authentication, encryption or other security procedures are possible. For example, authentication may be implemented at a remote location of the service 17 (e.g., website supported by the public Internet) instead of within the wireless network 16. In this example, the network connection 38 may redirect communications from a communications device 14 to the location of the service 17 for authentication, and if authenticated, the communications may be forwarded from the service 17 to an appropriate destination identified within the communications. The redirected communications may comprise authentication information provided initially by configuration device 12 in one embodiment. Other embodiments are possible for authentication and implementing access to service 17.

Referring to FIG. 5, a method for implementing security functions is described in accordance with one embodiment. Other methods are possible including more, less or alternative steps.

At a step S10, a configuration device is programmed to store wireless network access data and network security data.

At a step S12, wireless network access data and network security data is communicated from the configuration device to the communications device.

At a step S14, the communications device uses the wireless network access data (e.g., SSID data) to access the wireless network.

At a step S16, the communications device communicates the network security data to the wireless network for authentication operations. If the authentication is successful, the communications device is granted access to secure portions of the wireless network. If the authentication is not successful, the communications device is not granted access to secure portions of the network and all requests and other communications originating from the communications device may be blocked.

At a step S18 following proper authentication, wireless communications intermediate the communications device and secure (or other) portions of the wireless network are provided. In one embodiment, the communications are encrypted using the network security data downloaded from the configuration device.

Referring to FIG. 6, a method of accessing a dynamic key distribution service of the wireless network according to one embodiment is illustrated. Other methods are possible including more, less or alternative steps.

At a step S30, the communications device accesses the key distribution service using network security data received from the configuration device. The accessing may include using location and type information of the key distribution service provided within the network security data. Alternately, the communications device may search the wireless network to locate the distribution service.

At a step S32, the communications device forwards a request to the distribution service to pull a dynamic cryptographic key.

At a step S36, the communications device receives a dynamic cryptographic key responsive to the request.

At a step S38, the communications device is configured to provide encrypted communications with respect to the wireless network using the dynamic cryptographic key.

Thereafter, the method may loop to step S36 to receive a new dynamic cryptographic key (e.g., rotated from the access point). Once accessed by communications device 14, the dynamic key distribution service may send new keys to communications device 14 as part of the key rotation.

At least some aspects of the disclosure facilitate configuration of wireless devices implementing advanced security. A configuration device may be used to easily administer the configuration and/or reconfiguration of numerous wireless communications devices. The configuration device may also provide secure handling of initial wireless and cryptographic parameters. The parameters may not be observed since they are not transmitted through the network in at least one embodiment. Future cryptographic keys may be communicated through the infrastructure of the wireless network for rotation and may be encrypted. Accordingly, network security data permitting the communications device to participate in the environment of the wireless network supporting a dynamic key exchange and/or other security measures is provided and may be easily stored and communicated to the communications device using the configuration device.

The protection sought is not to be limited to the disclosed embodiments, which are given by way of example only, but instead is to be limited only by the scope of the appended claims.

What is claimed is:

1. A wireless network communications method comprising:
   providing wireless network access data and network security data using a configuration device, wherein the wireless network access data corresponds to a respective wireless network;
   communicating the wireless network access data and the network security data to a communications device using the configuration device;
   providing access of the communications device to a first portion of the wireless network using the wireless network access data;
   communicating the network security data to the wireless network using the communications device;
   providing access of the communications device to a second portion of the wireless network using the network security data; and
   wherein the communicatings individually comprise communicating service information usable by the communications device to access a service which is accessible using the wireless network.

2. The method of claim 1 wherein the first portion comprises an authentication portion of the wireless network and the second portion comprises a secure portion of the wireless network accessible using the network security data.

3. The method of claim 1 wherein the network security data comprises authentication data used to authenticate the communications device.

4. The method of claim 1 wherein the network security data comprises encryption data usable to perform encryption operations with respect to information communicated intermediate the communications device and the second portion of the wireless network.

5. The method of claim 1 wherein the network security data identifies a location of a dynamic key distribution service configured to implement secure wireless communications of the wireless network.

6. The method of claim 1 wherein the network security data identifies a type of a dynamic key distribution service configured to implement secure communications of the wireless network.

7. The method of claim 1 wherein the communications device is configured to search to locate a dynamic key distribution service, and to pull at least one cryptographic key from the key distribution service responsive to the searching identifying the location of the key distribution service.

8. The method of claim 1 wherein the communicating wireless network access data comprises communicating network identification information of the wireless network.

9. A communications device operational method comprising:
   providing a communications device configured to implement wireless communications;
   receiving wireless network access data and network security data from a configuration device within the communications device, wherein the received data corresponds to a respective wireless network;
   communicating the wireless network access data to the wireless network using the communications device;
   communicating the network security data to the wireless network using the communications device; and
   communicating information intermediate the communications device and the wireless network after the communicatings of the wireless network access data and the network security data.

10. The method of claim 9 wherein the network security data comprises authentication data usable to authenticate the communications device.

11. The method of claim 9 wherein the network security data comprises encryption data usable to perform encryption operations with respect to information communicated intermediate the communications device and the wireless network.

12. The method of claim 9 wherein the network security data identifies a location of a dynamic key distribution service configured to implement secure wireless communications of the wireless network.

13. The method of claim 9 wherein the network security data identifies a type of a dynamic key distribution service configured to implement secure communications of the wireless network.

14. The method of claim 9 further comprising dynamically obtaining cryptographic keys from a dynamic key distribution service using the network security data.

15. A configuration device comprising:
   a communications interface for implementing electronic communications of the configuration device with a communications device external of the configuration device;
   a storage device for storing wireless network access data and network security data corresponding to a respective wireless network and for outputting the wireless network access data and network security data to the communications interface for communication externally of the configuration device to the communications device using the communications interface;
   wherein the wireless network access data comprises data for configuring the communications device to access and to implement communications with the respective wireless network, and the network security data comprises data for configuring the communications device according to a security protocol implemented using the wireless network; and
   wherein the storage device comprises a device for storing service information usable by the communications device to access a service which is accessible using the wireless network.

16. The device of claim 15 wherein the network security data comprises authentication data used to authenticate the communications device.

17. The device of claim 15 wherein the network security data comprises encryption data usable to perform encryption operations with respect to information communicated intermediate the communications device and the wireless network.

18. The device of claim 15 wherein the network security data identifies a location of a dynamic key distribution service configured to implement secure wireless communications of the wireless network.

19. The device of claim 15 wherein the network security data identifies a type of a dynamic key distribution service configured to implement secure communications of the wireless network.

20. The device of claim 15 wherein the network security data comprises an identifier of a dynamic key distribution service, and a command configured to cause the communications device to pull at least one cryptographic key from the key distribution service.

21. The method of claim 1 wherein the service information comprises an electronic address of the service.

22. The method of claim 1 wherein the service information comprises a command configured to initiate performance of an action of the service with respect to the communications device.

23. The device of claim 15 wherein the service information comprises an electronic address of the service.

24. The device of claim 15 wherein the service information comprises a command configured to initiate performance of an action of the service with respect to the communications device.

* * * * *

UNITED STATES PATENT AND TRADEMARK OFFICE
CERTIFICATE OF CORRECTION

| | | |
|---|---|---|
| PATENT NO. | : 7,269,653 B2 | Page 1 of 1 |
| APPLICATION NO. | : 10/703878 | |
| DATED | : September 11, 2007 | |
| INVENTOR(S) | : Duane Mentze et al. | |

It is certified that error appears in the above-identified patent and that said Letters Patent is hereby corrected as shown below:

In column 1, line 15, delete "10/703,877" and insert -- 10/703,862 --, therefor.

Signed and Sealed this

First Day of July, 2008

JON W. DUDAS
*Director of the United States Patent and Trademark Office*